United States Patent
Pathan et al.

(10) Patent No.: US 11,507,387 B2
(45) Date of Patent: Nov. 22, 2022

(54) METHOD TO OPTIMIZE SYSTEM BOOT TIME OF MODULES/DRIVER'S EXECUTION IN UEFI PRE-BOOT ENVIRONMENT

(71) Applicant: DELL PRODUCTS L.P., Round Rock, TX (US)

(72) Inventors: Mohammad Younas Khan Pathan, Punganur (IN); Annappa Kumar M N, Rajajinagar (IN); Karunakar Poosapalli, Hyderabad (IN); Shivani Dwivedi, Ghaziabad (IN); Naresh Dhiman, Bangalore (IN); Thirupathi Komatireddy, Bhupalpally (IN)

(73) Assignee: DELL PRODUCTS L.P., Round Rock, TX (US)

( * ) Notice: Subject to any disclaimer, the term of this patent is extended or adjusted under 35 U.S.C. 154(b) by 93 days.

(21) Appl. No.: 16/883,125

(22) Filed: May 26, 2020

(65) Prior Publication Data

US 2021/0373906 A1    Dec. 2, 2021

(51) Int. Cl.
*G06F 9/44* (2018.01)
*G06F 9/4401* (2018.01)

(52) U.S. Cl.
CPC .................. *G06F 9/4403* (2013.01)

(58) Field of Classification Search
CPC .............................. G06F 9/4403; G06F 9/4401
See application file for complete search history.

(56) References Cited

U.S. PATENT DOCUMENTS

| | | | |
|---|---|---|---|
| 8,291,209 B2 | 10/2012 | Chong et al. | |
| 8,443,183 B2 | 5/2013 | Lin et al. | |
| 8,549,276 B2 | 10/2013 | Chen et al. | |
| 8,830,228 B2 | 9/2014 | Zhang et al. | |
| 8,892,858 B2 | 11/2014 | Smith et al. | |
| 9,495,177 B2 | 11/2016 | Zimmer et al. | |
| 2010/0318961 A1* | 12/2010 | Khoruzhenko | G06F 9/4411 717/107 |
| 2018/0032349 A1 | 2/2018 | Bhimanadhuni et al. | |
| 2018/0165101 A1 | 6/2018 | Bulusu et al. | |
| 2018/0267920 A1 | 9/2018 | Lin | |
| 2020/0218544 A1 | 7/2020 | Ganesan et al. | |

OTHER PUBLICATIONS

"EDK II Module Information (INF) File Specification". Jan. 2016. Intel. https://github.com/tianocore-docs/Docs/blob/master/Specifications/INF_Spec_1_25.pdf (Year: 2016).*
"Computer: Registers Memory" (2019) https://www.tutorialandexample.com/registers (Year: 2019).*

* cited by examiner

*Primary Examiner* — Stefan Stoynov
(74) *Attorney, Agent, or Firm* — Jackson Walker LLP; Christopher J. Rourk

(57) ABSTRACT

A system for controlling a processor, comprising a processor configured to load one or more instructions into a register for execution, a non-volatile memory coupled to the processor and configured to store data in a format that can be read by the processor and a description file stored in the non-volatile memory, the description file further comprising a plurality of information files, wherein each information file includes two or more types of predetermined data.

19 Claims, 2 Drawing Sheets

METHOD TO OPTIMIZE SYSTEM BOOT TIME OF MODULES/DRIVER'S EXECUTION IN UEFI PRE-BOOT ENVIRONMENT

TECHNICAL FIELD

The present disclosure relates generally to processors, and more specifically to a method to optimize system boot time of module or driver execution in a UEFI pre-boot environment.

BACKGROUND OF THE INVENTION

When processors are started, which is commonly referred to as "booting," problems can occur if changes to the system configuration have occurred, or if there are other issues. Recovery from such problems can require special assistance and is a significant problem.

SUMMARY OF THE INVENTION

A system for data processing is disclosed that includes a processor that is configured to load one or more instructions into a register for execution. A non-volatile memory is connected to the processor and is configured to store data in a format that can be read by the processor, and also to store a description file stored in the non-volatile memory. The description file includes a plurality of information files, wherein each information file includes two or more types of predetermined data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
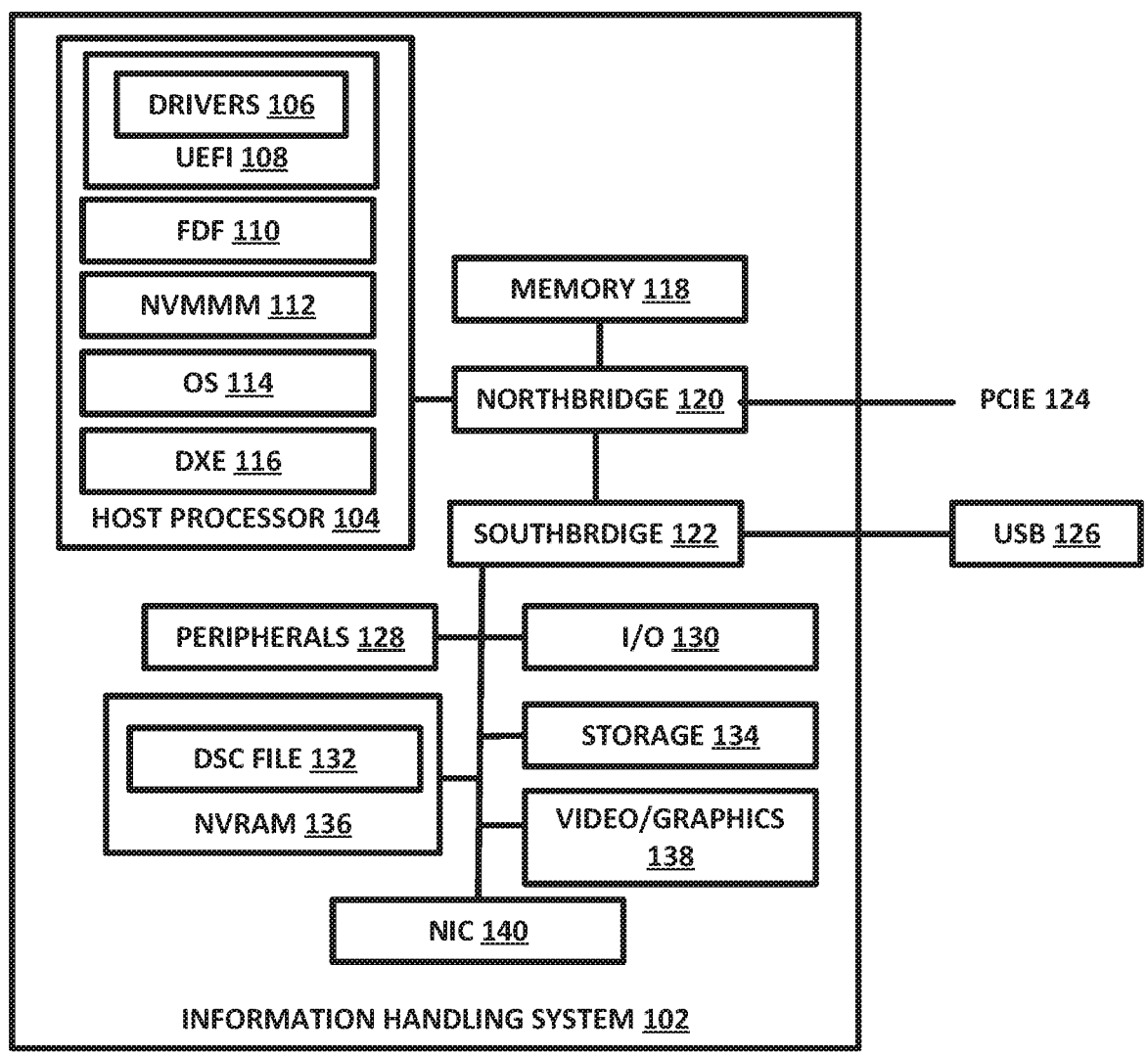
FIG. 1 is a diagram of an information handling system, such as a server, desktop computer, laptop and so forth, that can be configured according to one example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

In a unified extensible firmware interface (UEFI) processor pre-boot operating environment, each driver that is to be loaded onto the processor can be dependent on specific interfaces, such as a programmable peripheral interface (PPI) or protocol, and can be loaded into memory (RAM) once such dependency is satisfied. Upon loading into memory, the driver can be given control to perform its task. If any driver has dependency on a non-volatile random access memory (NVRAM) variable, then the driver should 1) be loaded into memory, 2) get the NVRAM variable, 3) check for the variable value and 4) perform its task. If an NVRAM variable has no valid value, then the driver should simply quit without performing any task. There is no practical way to avoid loading those drivers into memory and giving control to those drivers before that point is reached, and in turn, this constraint increases the boot time of the system.

The problem discussed above can exist for drivers that depend on CMOS variables. Consider a driver that has a dependency on a recovery flag or firmware update flag that should be present in NVRAM. Even if the system is not booting in a recovery or firmware update mode, the driver will be dispatched (load and execute) in all boot modes, which is of no use and increases boot time of system.

Another example where this problem can occur is a driver that has dependency on a secure boot variable. Even if the system is not booting in secure boot mode, the driver will be dispatched to load and execute in all boot modes, which is of no use and which increases boot time of system.

A description (DSC) file can include a list of information (INF) files that are to be built by an EDKII build procedure. EDKII is a cross-platform firmware development environment for the UEFI and UEFI Platform Initialization (PI) specifications. In a DSC file, a section named "Components.IA32" can have Pre-EFI Initialization (PEI) modules, and a section named "Components.X64" can have all other drivers.

A flash description file (FDF) can have a list of INF files as part of flash values (FVs), and can be included in a firmware binary (BIOS binary). An a-priori file can contain a list of drivers/modules that can be built at an earliest time without checking dependencies. Those drivers/modules can be used to initialize basic services needed for loading and executing of other drivers.

In the UEFI protocol, each driver has an information (INF) file that can contain data that includes a driver name, a list of files that are used in the driver, an identification of interfaces (PPIs or protocols) that are used, dependency information and other suitable information. The driver can also be called a module.

For a simple INF file format, the following data can be included:

[Defines]—macros for module type, INF file GUID, Entry point, Library class of the module.

[Sources]—a list of source files (such as C, ASM, H) to be built as part of the module.

[Protocols]—a list of protocols consumed/produced by the module.

[Guids]—a list of Guids (such as Memory Hob Guid) used by the module.

[LibraryClasses]—contains list of Libraries used by the module.

[Packages]—contains list of packages which includes Protocols, Guids and so forth while building auto generation files for the module.

[Pcd]—contains list of all Pcds used by the module.

[Depex]—contains dependency protocols list.

Each UEFI boot phase, such as the PEI phase, DXE phase and SMM phase, can have core drivers that can initialize the basic services needed for driver to load into memory and execute. NVRAM (Non-Volatile RAM) which contains BIOS settings in the form of variables called "NVRAM variables". Each NVRAM variable can be identified with variable name, GUID and contains data with specific data size.

The following procedure can be used to read NVRAM in the PEI phase. First, NVRAM can have set of variables identified with variable names and Guids. EFI_PEI_READ_ONLY_VARIABLE2_PPI has GetVariable( ) and NextVariableName2 ( ) APIs to read the NVRAM variables. Note: we cannot set the NVRAM variables in PEI phase.

The following procedure can be used to read/write NVRAM in DXE or later phase: EFI_RUNTIME_SERVICES has GetVariable( ), GetNextVariableName( ), SetVariable( ) APIs to read/write into NVRAM.

The present disclosure allows each driver/module to be executed in the order disclosed, during the build time of the UEFI firmware in the FDF. The dependency information can be generated while building each driver. Each driver can provide one or more NVRAM variables and offsets in variable as a dependency, along with interface dependencies (such as PPIs and protocols) in its INF file. The PEI/DXE/SMM core dispatcher drivers can load the NVRAM variables into temporary memory (RAM). Before dispatching each driver, a dispatcher process can check for NVRAM variable dependencies along with interface dependencies. If these dependencies are satisfied, the dispatcher process can load the driver into memory and configure the system to provide control to the driver. Otherwise, the driver can be prevented from loading and executing during the UEFI boot process, to increase system efficiency and to reduce the boot time of system.

The following method or process can be implemented as an algorithm and used to optimize the system boot time of the modules and driver execution in a UEFI pre-boot environment.

First, the core services to load a module or driver into memory can be initialized, such as the PEI, DXE or SMM core. Next, the method checks the NVRAM for data and loads the NVRAM data into temporary memory, such as RAM. The process then loads drivers which are mentioned in an a priori file, which are drivers that need to load at a very early stage without checking for dependencies. The boot process then starts with a first module or driver (non-core) in the UEFI firmware.

Next, a series of processes are performed that can be skipped if it is determined that the process step does not apply. The first process is to determine whether the module or driver has a dependency on a protocol. If not, then the process checks to determine whether the protocol dependency is satisfied or can be skipped, and if so, it is determined whether the driver or module has a dependency on NVRAM variable. If the module or driver has a dependency on a protocol that has not been satisfied and cannot be skipped, that module or driver is skipped, and the next module or driver is checked.

If the module or driver has a dependency on an NVRAM variable, it is determined whether the NVRAM variable has valid value needed for the module or driver to load. If the NVRAM variable does not have a valid value, that module or driver is skipped, and the next module or driver is checked. If the NVRAM variable has a valid value, the module or driver is dispatched by loading it into memory (RAM) and giving system control to the driver to perform its task. This process is repeated for all modules or drivers in firmware, after which the UEFI firmware boot process is completed.

The disclosed process avoids loading and executing drivers that depending on NVRAM variables or CMOS variables that are not present, and improves the boot time of UEFI pre-boot environment. The disclosed process only loads the specific modules and drivers that are needed for specific boot modes, using NVRAM variables. There is presently no known way to avoid loading and executing modules or drivers that are not needed as per NVRAM variable values from a UEFI pre-boot environment. Any suitable UEFI boot firmware can use the present disclosure to reduce boot time.

FIG. 1 is a diagram 100 of an information handling system 102, such as a server, desktop computer, laptop and so forth, that can be configured according to one example embodiment of the present disclosure. Information handling system 102 can include one or more host processing device 104 (such as an AMD or Intel-based CPU or other suitable host processing device), one or more buses or communication media (such as PCIe bus 124, USB 126, a memory bus or other suitable data buses), video/graphics hardware 138 (such as a video adapter or graphics processor unit), storage 134 (such as a hard disk drive or optical drive), system volatile memory 118 (such as DRAM), local input/output (I/O) 130, peripherals 128 (such as a keyboard and mouse), and a remote access controller (RAC) (not shown). Examples of a remote access controller include an integrated Dell Remote Access Controller (iDRAC) available from Dell Products L.P. of Round Rock, Tex.). Host processor 104 can be configured to load and run UEFI 108 (with drivers 106 as shown), operating system (OS) 114 (such as a Windows-based OS or Linux-based OS), NVRAM management module (NVMMM) 112, FDF 110, DXE 116 and other suitable systems and processes as discussed and disclosed herein.

The buses provide a mechanism for the various components of system 100 to communicate and couple with one another. As shown, host processor 104 can be coupled in an embodiment to bus via northbridge 120 that can be a separate component (such as a Northbridge chip), its functions can be integrated within host processor 104 or other suitable processes can also or alternatively be used. Northbridge 120 can be directly coupled to system memory 118 as shown, through southbridge 122 (or a platform controller hub (PCH) or other suitable systems or devices), to facilitate input/output functions for host processer 104 with various internal system components of information handling system 102 through buses. Examples of such system components that may be accessed through southbridge 122 with DMA include, but are not limited to, NVRAM 136, BIOS SPI Flash, NVDIMMS, DIMMS, PCIe devices and so forth.

In one embodiment, host processor 104 can be an in-band processing device configured to run OS 114. In addition to memory 118, information handling system 102 can include cache memory for storage of frequently accessed data. Information handling system 102 can also include a network interface card (NIC) 140 that is communicatively coupled to a network (such as the Internet or other network) to allow various components of diagram 100 to communicate with external and/or remote devices across the network. In this embodiment, Host processor 104 is coupled to NVRAM 136 (such as embedded and partitioned flash memory, Electrically Erasable Programmable Read Only Memory-EEPROM, other types of non-volatile random access memory) that is configured to store persistent information for system components, such as DSC file 132, UEFI firmware and/or other suitable data and algorithms. As described in more detail below, NVRAM 136 can be configured to store system configuration data (SCD), such as UEFI variables and/or other suitable system data and algorithms, and can be implemented by one or more NVRAM storage devices, such as flash memory devices.

It will be understood that diagram 100 is an example only, and that an information handling system can be provided with one or more processing devices that may perform the functions of host processor 104. Examples of such processing devices include, but are not limited to, central processing units (CPUs), embedded controllers, microcontrollers, application specific integrated circuits (ASICs), field programmable gate arrays (FPGAs) and so forth.

DSC file 132 includes the components, data and algorithms discussed herein, including but not limited to a list of information (INF) files, a section named Components.IA32 that can have Pre-EFI Initialization (PEI) modules, a section named "Components.X64" can have all other drivers, an FDF that can have a list of INF files as part of flash values (FVs), which can be included in a firmware binary (BIOS binary), an a-priori file that can contain a list of drivers/modules that can be built at an earliest time without checking dependencies, and so forth. The INF file can contain data that includes a driver name, a list of files that are used in the driver, an identification of interfaces (PPIs or protocols) that are used, dependency information and other suitable information. The driver can also be called a module. The following data can be included: [Defines], [Sources], [Protocols], [Guids], [LibraryClasses], [Packages], [Pcd] and [Depex]. One of skill in the art will understand that these elements are present in diagram 100 without being specifically identified.

Figure 2:
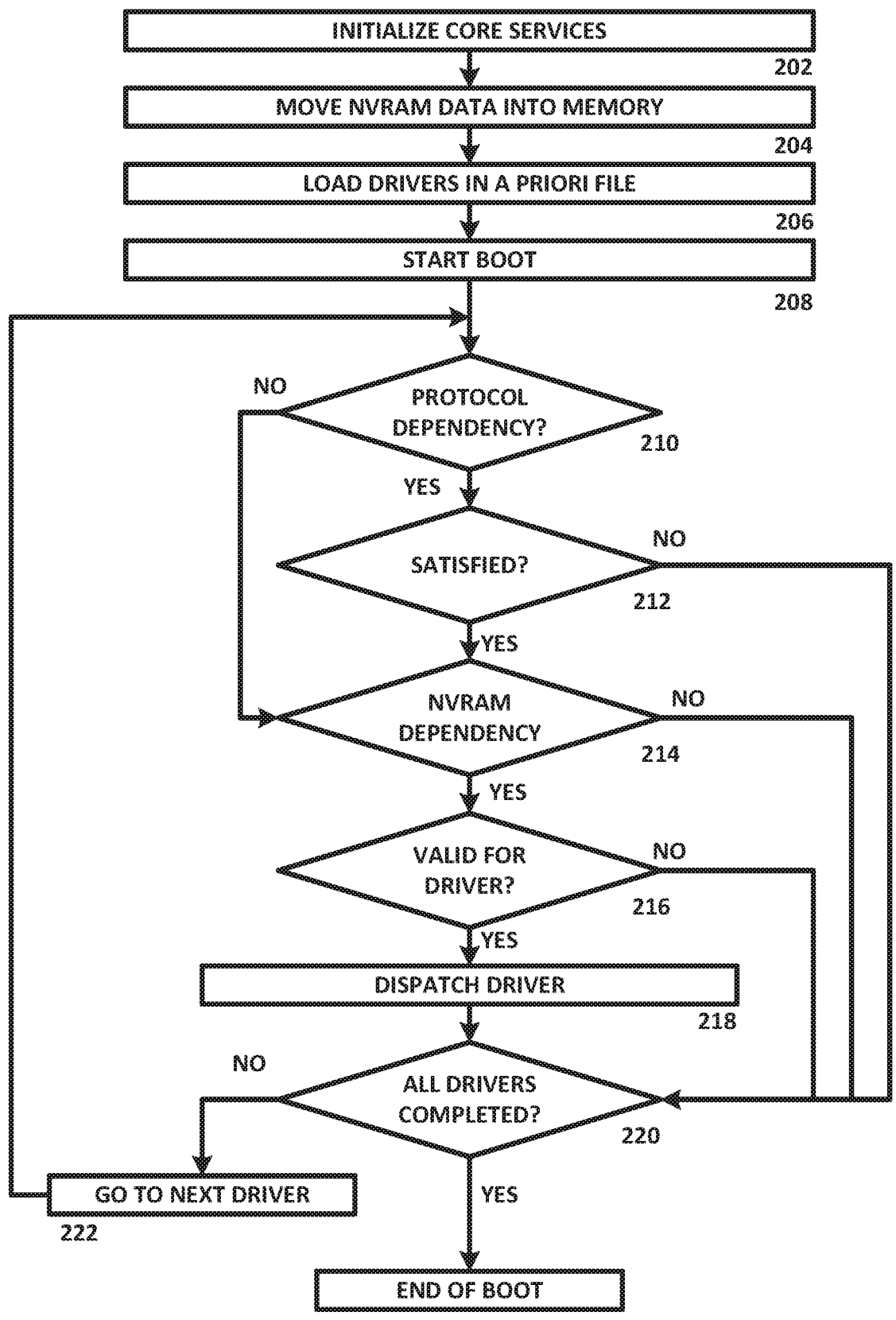
FIG. 2 is a diagram of an algorithm for optimizing system boot time of module or driver execution in a UEFI pre-boot environment, in accordance with an example embodiment of the present disclosure.

FIG. 2 is a diagram of an algorithm 200 for optimizing system boot time of module or driver execution in a UEFI pre-boot environment, in accordance with an example embodiment of the present disclosure. Algorithm 200 can be implemented on one or more processors.

Algorithm 200 begins at 202, where one or more processor commands cause the core services to load modules and drivers into memory, such as PEI, DXE or SMM core services. In one example embodiment, the processor can execute commands that cause data stored in predetermined memory locations to be copied to a second location, such as a stack of commands that are used to control the operation of the processor or other suitable data. The predetermined memory locations can include algorithmic instructions associated with the PEI core services, the DXE core services, the SMM core services or other suitable data or instructions. The algorithm then proceeds to 204.

At 204, instructions cause the processor to checks and gets the NVRAM data into temporary memory (RAM). In one example embodiment, the NVRAM can be used to hold data and instructions that are not immediately used by the processor, but which are transferred to RAM prior to being used. In this example embodiment, the data stored in predetermined locations in NVRAM are copied into a buffer and then stored in predetermined locations in RAM, or other suitable processes can also or alternatively be used. The algorithm then proceeds to 206.

At 206, drivers that are included in an a priori file that need to load at an early stage in the pre-boot or boot process are loaded, such as before any dependencies need to be checked. A dependency can be a system component, such as an algorithm or hardware that is needed in order for a driver to function, and the drivers that are loaded can be ones that do not have any such dependencies. In one example embodiment, the a priori file can include data that identifies a location where the driver can be found, where the driver is a set of algorithmic instructions that are used by the processor to perform a specific function that is typically related to hardware but which can also or alternatively have other associated functions. The a priori file can be identified as data contained within a specific memory location or in other suitable manners, and can include addresses, algorithms, variable definitions or other suitable data. The algorithm then proceeds to 208.

At 208, the boot process starts with a first module or driver in the UEFI firmware that is not a core module or driver. In one example embodiment, a boot process can refer to a series of algorithmic instructions that are executed by a processor to configure other system hardware and software components to operate, such as peripherals, video or graphs, input/output ports and so forth. The algorithm then proceeds to 210.

At 210, it is determined whether the driver or module has a dependency on a protocol. In one example embodiment, a protocol can define how system software or hardware communicates, interoperates or otherwise functions. If it is determined that a protocol dependency exists, the algorithm proceeds to 212, otherwise it proceeds to 214.

At 212, it is determined whether the dependency of the protocols is satisfied for the driver or module. In one example embodiment, one or more instructions can be executed by the processor to determine the status of the protocol, such as by generating an output and determining whether a predetermined response is received or in other suitable manners. If it is determined that the dependency is satisfied, the algorithm proceeds to 214, otherwise the algorithm proceeds to 220.

At 214, it is determined whether the driver or module has a dependency on an NVRAM variable. In one example embodiment, a NVRAM variable can define the system software or hardware or other suitable data. If it is determined that an NVRAM variable dependency exists, the algorithm proceeds to 216, otherwise it proceeds to 220.

At 216, it is determined whether the NVRAM variable has a value that is needed for module or driver to load. In one example embodiment, one or more instructions can be executed by the processor to determine the value of the NVRAM variable, such as by comparing a data value that is stored in a register or returned in response to an output that is generated has a predetermined value, or in other suitable manners. If it is determined that the NVRAM variable has a suitable value, the algorithm proceeds to 218, otherwise the algorithm proceeds to 220.

At 218, the module or driver is dispatched by loading it into memory (RAM) and giving operational control to the driver to perform its task. In one example embodiment, operational control can be given to a driver by causing the processor to load the driver into an instruction cache and to execute the driver, or in other suitable manners. The algorithm then proceeds to 220.

At 220, it is determined whether all of the modules or drivers have completed execution. If it is determined that the have not completed execution, the algorithm proceeds to 222, where the next driver or module is selected. Otherwise, the algorithm proceeds to 224 and the boot process ends.

In operation, algorithm 200 allows a system boot time of module and driver execution in a UEFI pre-boot environment to be optimized, by ensuring that drivers or modules that are unable to be loaded and executed are skipped. Although algorithm 200 is shown as a flow chart, one of skill in the art will recognize that it can also or alternatively be implemented using object-oriented programming, one or more ladder diagrams, one or more state diagrams or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data processing, comprising:
 a processor configured to load one or more instructions into a register for execution;
 a non-volatile random access memory (NVRAM) coupled to the processor and configured to store data in a format that can be read by the processor; and
 a description file stored in the NVRAM, the description file further comprising a plurality of information files, wherein each information file includes two or more types of predetermined data;
wherein the processor is configured to:
determine whether a driver has a dependency on a variable stored in the NVRAM using the register after determining whether a protocol dependency has been satisfied; and
give operational control to the driver when it is determined that the protocol dependency has been satisfied, the driver depends on the variable stored in the NVRAM, and the value of the variable is valid for the driver to load.

2. The system of claim 1 wherein the two or more types of predetermined data of the information files comprises "defines" that includes one or more macros for a module type, an information file identifier, an entry point and a library class of a module, and the description file is a single file.

3. The system of claim 1 wherein the two or more types of predetermined data of the information files comprises "sources" that includes a list of source files to be built as part of a module and the processor is configured to load the one or more instructions into the register for execution during a pre-boot phase.

4. The system of claim 1 wherein the two or more types of predetermined data of the information files comprises "protocols" that includes a list of protocols to be consumed or produced by a module, and the processor is configured to determine whether the module has a dependency on one or more of the protocols.

5. The system of claim 1 wherein the two or more types of predetermined data of the information files comprises "guids" that includes a list of identifiers to be used by a module.

6. The system of claim 1 wherein the two or more types of predetermined data of the information files comprises "library classes" that includes a list of Libraries to be used by a module.

7. The system of claim 1 wherein the two or more types of predetermined data of the information files comprises "packages" that includes a list of packages needed for auto generation files for a module.

8. The system of claim 1 wherein the two or more types of predetermined data of the information files comprises "depex" that includes a dependency protocols list.

9. A method for data processing, comprising:
loading one or more instructions into a register of a processor for execution;
storing data in a format that can be read by the processor in a non-volatile random access memory (NVRAM) coupled to the processor;
reading a description file from the NVRAM, the description file further comprising a plurality of information files, wherein each information file includes two or more types of predetermined data;
determining whether a driver has a dependency on a variable stored in the NVRAM using the register after determining whether a protocol dependency has been satisfied; and
giving operational control to the driver when it is determined that the protocol dependency has been satisfied, the driver depends on the variable stored in the NVRAM, and the value of the variable is valid for the driver to load.

10. The method of claim 9 wherein the two or more types of predetermined data of the information files comprises "defines" that includes one or more macros for a module type, an information file identifier, an entry point and a library class of a module.

11. The method of claim 9 wherein the two or more types of predetermined data of the information files comprises "sources" that includes a list of source files to be built as part of a module, and the description file is a single file.

12. The method of claim 9 wherein the two or more types of predetermined data of the information files comprises "protocols" that includes a list of protocols to be consumed or produced by a module, and further comprising:
determining whether the module has a dependency on one or more of the protocols; and
determining whether the dependency is satisfied for the module.

13. The method of claim 9 wherein the two or more types of predetermined data of the information files comprises "guids" that includes a list of identifiers to be used by a module.

14. The method of claim 9 wherein the two or more types of predetermined data of the information files comprises "library classes" that includes a list of Libraries to be used by a module.

15. The method of claim 9 wherein the two or more types of predetermined data of the information files comprises "packages" that includes a list of packages needed for auto generation files for a module in a pre-boot environment.

16. The method of claim 9 wherein the two or more types of predetermined data of the information files comprises "depex" that includes a dependency protocols list.

17. The system of claim 1 wherein the register stores a value for comparing to an NVRAM variable in a pre-boot phase.

18. The method of claim 9 further comprising:
determining whether a driver has a dependency on a variable stored in NVRAM during a pre-boot phase; and
determining whether the NVRAM variable has a value that is needed for the driver to load.

19. The method of claim 9 further comprising:
determining whether a driver has a dependency on a variable stored in NVRAM in a pre-boot environment; and
determining whether the NVRAM variable has a value that is needed for the driver to load using one or more instructions executed by the processor to determine the value of the NVRAM variable by comparing a data value that is stored in a register to an output that is has a predetermined value.

* * * * *